(12) United States Patent
Hoffmann et al.

(10) Patent No.: US 10,479,008 B2
(45) Date of Patent: Nov. 19, 2019

(54) APPARATUS AND TECHNIQUES FOR COATING PIPELINE FIELD JOINTS

(71) Applicant: Subsea 7 Limited, Sutton (GB)

(72) Inventors: Philippe Benoit Jacques Hoffmann, Rousset-les-Vignes (FR); Mike Gordon, Godalming (GB); Nicolas Monfort-Moros, London (GB); Sylvain Popineau, London (GB)

(73) Assignee: Subsea 7 Limited, Sutton (GB)

( * ) Notice: Subject to any disclaimer, the term of this patent is extended or adjusted under 35 U.S.C. 154(b) by 543 days.

(21) Appl. No.: 15/100,629

(22) PCT Filed: Dec. 2, 2014

(86) PCT No.: PCT/GB2014/053581
§ 371 (c)(1),
(2) Date: May 31, 2016

(87) PCT Pub. No.: WO2015/082909
PCT Pub. Date: Jun. 11, 2015

(65) Prior Publication Data
US 2016/0297125 A1 Oct. 13, 2016

(30) Foreign Application Priority Data
Dec. 2, 2013 (GB) .................................. 1321234.5

(51) Int. Cl.
*B29C 45/14* (2006.01)
*B29C 45/62* (2006.01)
(Continued)

(52) U.S. Cl.
CPC ...... *B29C 45/14622* (2013.01); *B29C 31/041* (2013.01); *B29C 31/063* (2013.01);
(Continued)

(58) Field of Classification Search
CPC ............. B29C 45/14622; B29C 45/53; B29C 45/7207; B29C 45/76; B29C 45/23;
(Continued)

(56) References Cited

U.S. PATENT DOCUMENTS

| 4,800,049 A | 1/1989 | Gras |
| 5,071,672 A | 12/1991 | Carlson, Jr. et al. |
| 7,291,008 B2 | 11/2007 | Habibi-Naini |

FOREIGN PATENT DOCUMENTS

| DE | 199 28 770 | 8/2000 |
| EP | 0571334 | 11/1993 |

(Continued)

*Primary Examiner* — Robert J Grun
(74) *Attorney, Agent, or Firm* — Levy & Grandinetti

(57) ABSTRACT

An injection molding apparatus has a mold tool that is positioned around a field joint of a pipeline to define a mold cavity. Two or more pumping chambers communicate with the mold tool. Each chamber is expansible to draw in molten polymer and contractible to drive the polymer into the mold cavity. Expansion of one chamber is synchronized with contraction of another chamber. The operation of supply and injection valves associated with the chambers is also synchronized, both with each other and with expansion and contraction of the chambers. In the embodiment described, two pumping chambers are defined within a common pressurizing cylinder, in which the chambers are separated by a piston. The piston is movable within the cylinder to determine and to synchronize expansion and contraction of the chambers.

35 Claims, 7 Drawing Sheets

(51) Int. Cl.
 *B29C 45/23*  (2006.01)
 *F16L 59/20*  (2006.01)
 *B29C 45/72*  (2006.01)
 *B29C 45/53*  (2006.01)
 *F16L 13/02*  (2006.01)
 *F16L 58/18*  (2006.01)
 *B29C 45/76*  (2006.01)
 *B29C 45/18*  (2006.01)
 *B29C 31/04*  (2006.01)
 *B29C 31/06*  (2006.01)
 *B29C 45/04*  (2006.01)
 *B29K 705/00*  (2006.01)
 *B29K 23/00*  (2006.01)
 *B29C 45/46*  (2006.01)
 *B29K 25/00*  (2006.01)
 *B29K 105/00*  (2006.01)
 *B29K 105/20*  (2006.01)
 *B29K 705/12*  (2006.01)
 *B29L 23/00*  (2006.01)

(52) U.S. Cl.
 CPC .............. *B29C 45/18* (2013.01); *B29C 45/23* (2013.01); *B29C 45/53* (2013.01); *B29C 45/62* (2013.01); *B29C 45/7207* (2013.01); *B29C 45/76* (2013.01); *F16L 13/0272* (2013.01); *F16L 58/181* (2013.01); *F16L 59/20* (2013.01); *B29C 45/04* (2013.01); *B29C 45/14336* (2013.01); *B29C 45/14598* (2013.01); *B29C 2045/465* (2013.01); *B29C 2945/76568* (2013.01); *B29C 2945/76688* (2013.01); *B29C 2945/76698* (2013.01); *B29C 2945/76829* (2013.01); *B29C 2945/76859* (2013.01); *B29K 2023/12* (2013.01); *B29K 2025/06* (2013.01); *B29K 2105/0067* (2013.01); *B29K 2105/20* (2013.01); *B29K 2705/00* (2013.01); *B29K 2705/12* (2013.01); *B29K 2995/0015* (2013.01); *B29K 2995/0058* (2013.01); *B29L 2023/22* (2013.01); *B29L 2023/225* (2013.01)

(58) Field of Classification Search
 CPC ....... B29C 45/62; B29C 45/18; B29C 31/041; B29C 31/063; B29C 2945/76688; B29C 2945/76829; B29C 2945/76568; B29C 2045/465; B29C 2945/76859; B29C 2945/76698; B29C 45/14598; B29C 45/14336; B29C 45/04; F16L 13/0272; F16L 59/20; F16L 58/181; B29K 2995/0015; B29K 2995/0058; B29K 2025/06; B29K 2105/20; B29K 2105/0067; B29K 2705/12; B29K 2023/12; B29K 2705/00; B29L 2023/225; B29L 2023/22
 See application file for complete search history.

(56) References Cited

FOREIGN PATENT DOCUMENTS

| | | |
|---|---|---|
| EP | 1 016 514 | 7/2000 |
| EP | 2 590 794 | 1/2012 |
| GB | 2490153 | 10/2012 |
| WO | WO 02/011972 | 2/2002 |
| WO | WO 03/018287 | 3/2003 |
| WO | WO 2004/050325 | 6/2004 |
| WO | WO 2007/049146 | 5/2007 |
| WO | WO 2008/055339 | 5/2008 |
| WO | WO 2008/071773 | 6/2008 |
| WO | WO 2011/033176 | 3/2011 |
| WO | WO 2011/144814 | 11/2011 |
| WO | WO 2012/004665 | 1/2012 |
| WO | WO 2012/172451 | 12/2012 |
| WO | WO 2013/070074 | 5/2013 |

APPARATUS AND TECHNIQUES FOR COATING PIPELINE FIELD JOINTS

This invention relates to coating pipes, in particular to apparatus and techniques for coating pipeline field joints and to pipelines having field joints coated by those techniques.

Pipelines used in the oil and gas industry are usually formed of lengths of steel pipe—'pipe joints'—that are welded together end-to-end before the pipeline is laid. To mitigate corrosion of the pipeline and optionally also to insulate the fluids that the pipeline carries in use, the pipe joints are pre-coated with protective parent coatings that, optionally, are also thermally insulating.

Many variations are possible in the structure and composition of the parent coating to obtain the required protective or insulative properties. Polypropylene (PP) is most commonly used to coat the pipe joints from which pipelines are made. The PP is typically applied onto an anti-corrosion base layer on the steel of a pipe joint, such as a fusion-bonded epoxy (FBE) coating.

A three-layer PP (3LPP) parent coating may be used for corrosion protection. Additional layers may be used if greater thermal insulation is needed, such as in a 5LPP or 7LPP coating. The terms '3LPP', '5LPP' and '7LPP' will be readily understood by persons skilled in the art.

A short length of pipe is left uncoated at each end of the pipe joint to facilitate welding. The resulting 'field joint' must be coated with a field joint coating to mitigate corrosion and to maintain whatever degree of insulation may be necessary for the purposes of the pipeline.

Where a pipeline is laid offshore, welding and field joint coating is commonly performed aboard a pipelaying vessel such as a laybarge that fabricates and launches the resulting pipe string using S-lay or J-lay methods. Welding and field joint coating may also be performed onshore at a spoolbase, where pipe joints are firstly joined to form long pipe stalks and the pipe stalks are later joined successively end-to-end to form a continuous pipe for spooling onto a visiting reel-lay vessel.

High-quality field joint coatings are important to ensure effective protection and insulation throughout the long design life of a subsea pipeline. It is also important that field joint coating operations can be completed quickly enough that they do not adversely delay the chosen fabrication process. This is a particular concern in an S-lay operation, where stepwise parallel processing in successive work stations allows the highest fabrication rate to minimise tie-up of a valuable pipelaying vessel. However, it is emphasised that the invention is not limited to S-lay operations or to use on a pipelaying vessel: the invention may be employed in J-lay operations and at an onshore spoolbase supporting reel-lay operations.

WO 2012/004665 explains that a cast-moulded polyurethane (CMPU) process may be used to produce field joint coatings. In a CMPU process, a two-part urethane resin cross-links in a mould around a field joint to form polyurethane (PU). However, WO 2012/004665 goes on to explain that CMPU field joint coatings suffer from the chemical dissimilarity between PP (a thermoplastic polymer) and PU (a thermoset polymer), which undermines the bond strength between the parent coating and the field joint coating. This introduces a risk that cracks may occur at the interface between the parent coating and the field joint coating.

As WO 2012/004665 acknowledges, the disadvantages of a CMPU field joint coating may be mitigated by instead using PP as a field joint coating. Specifically, a field joint coating of PP may be made by an injection-moulded polypropylene (IMPP) process.

In an IMPP process, the field joint is enclosed by a mould that defines an annular mould cavity around the field joint. Molten PP is injected into the cavity under high pressure. PP is a thermoplastic material and therefore sets by cooling during and after injection. Once the PP has cooled to a self-supporting extent, the mould is removed, leaving a tube of PP around the field joint that serves as the field joint coating.

Advantageously, the resulting PP field joint coating has similar mechanical and chemical properties to the adjoining PP parent coating. Also, the compatible thermoplastics materials of the parent coating and the field joint coating fuse together at their mutual interface, resisting cracking and hence giving longer service life. The service temperature of PP is also markedly higher than PU.

Whilst a PP field joint coating is desirable for the above reasons, the IMPP process presents considerable challenges in the context of fabricating subsea pipelines. For example, IMPP coating suffers from the viscosity of the molten PP and hence the need to pump and contain the PP at high moulding pressures. This adds to the bulk, complexity and cost of the mould and of the injection equipment that feeds molten PP to the mould. Increased bulk is a particular disadvantage where space is restricted, as for example on a vessel at sea.

U.S. Pat. No. 5,071,672 and WO 2011/033176 disclose field joint coating apparatus in which a rotary yoke or carriage turns around a pipe to apply a coating to an external surface of the pipe. In similar manner, EP 1016514 and WO 2002/011972 disclose wrapping a pre-prepared sheet or tape of coating material around the pipe. Also, WO 2008/071773 and WO 2012/172451 disclose how a sheet of coating material may be extruded from an extruder that itself turns around the pipe while a pressing roller compacts the sheet once applied.

As the layer of coating material is continuously applied as a sheet or as liquid or powder from a dispenser, rotary applicators such as those outlined above are irrelevant to injection moulding.

In the wider field of injection moulding per se, WO 2011/144814 discloses a screw-driven extruder for injection moulding of polymers. Screw-driven extruders in conjunction with accumulators are preferred for injecting polymers in a factory environment, including the application of parent coatings to pipe joints. However, such extruders and accumulators are bulky and so are not optimal for field joint coating, particularly of pipes for subsea use. So, injection moulding of PP does not lend itself to use outside the factory environment, as at a spoolbase or on a pipelaying vessel.

It is known to use a piston to push a shot of molten polymer material into a mould. An example is disclosed in WO 03/018287, although pressure is initially generated by screws in that case. However, piston-driven mould-filling is a discontinuous process while the piston undertakes return strokes and successive shots of material are positioned for injection. Where multiple shots are necessary to fill a mould, this slows the process. Pistons are also used in U.S. Pat. Nos. 4,800,049 and 7,291,008, but in those instances the pistons are merely driven by compressed air to open or close shut-off valves that regulate polymer flow to a mould. The pistons themselves do not act on the polymer.

In the IMPP process as applied to fabrication of subsea pipelines, the desirability of filling a mould quickly must be balanced against the need to cool the melt quickly to self-supporting solidity, bearing in mind that injection of molten material adds heat to the system.

It is against this background that the present invention has been devised.

In one sense, the inventive concept finds expression in injection moulding apparatus for coating a field joint of a pipeline. The apparatus of the invention comprises: a mould tool positionable around the field joint to define a mould cavity; and first and second pumping chambers defined within a common pressurising cylinder and communicating with the mould tool, each chamber being reciprocally expansible in an induction stroke for drawing molten polymer into that chamber from a melt supply and reciprocally contractible in a compression stroke for driving molten polymer out of that chamber into the mould cavity in use. Expansion of one of said chambers is synchronised with contraction of the other of said chambers such that the induction stroke of one of said chambers coincides with the compression stroke of the other of said chambers.

The apparatus of the invention preferably further comprises first and second injection valves, each of those injection valves being associated with a respective one of the pumping chambers and being interposed in a flow path between that pumping chamber and an injection gate of the mould tool. Similarly, first and second injection gates preferably communicate with the mould tool, each of those injection gates communicating with a respective one of the pumping chambers.

Advantageously, the apparatus is arranged for injection of molten polymer into the mould cavity through the first and second injection gates from the respective associated pumping chambers in alternation. It is possible, for example, for both the first and second pumping chambers to communicate with a shared injection gate via the respective associated injection valves. In that case, sequential injection of shots of molten polymer into the mould cavity may be effected through the shared injection gate, those shots being output in alternation from the first and second pumping chambers.

A controller suitably acts directly or indirectly on the first and second injection valves in coordination with expansion and contraction of the associated pumping chambers. Such a controller may be programmed to maintain the first and second injection valves in mutually opposite open and closed states while the mould cavity is being filled with molten polymer. The controller may also be programmed to hold open at least one of the first and second injection valves to pack the mould cavity during initial cooling of the molten polymer in the mould cavity; and/or to close the first and second injection valves during solidification of the molten polymer in the mould cavity.

The apparatus of the invention preferably further comprises first and second supply valves, each of those supply valves being associated with a respective one of the pumping chambers and being interposed in a flow path between the melt supply and the associated pumping chamber. Again, a controller may be programmed to maintain the first and second supply valves in mutually opposite open and closed states while the mould cavity is being filled with molten polymer.

Advantageously, the apparatus of the invention is arranged to maintain the injection valve and the supply valve associated with a respective one of the first and second pumping chambers in mutually opposite open and closed states while the mould cavity is being filled with molten polymer. For example, opening and closing of the injection valve or the supply valve associated with a pumping chamber may be slaved to closing and opening of the other of those valves associated with that pumping chamber.

The inventive concept also finds expression in a method of coating a field joint of a pipeline. The method of the invention comprises: drawing molten polymer from a melt supply into a first pumping chamber of a pressurising cylinder; and simultaneously expelling molten polymer from a second pumping chamber of that pressurising cylinder into a mould cavity around the field joint. The method may involve holding open a supply valve associated with the first pumping chamber while holding closed an injection valve associated with the first pumping chamber; and simultaneously holding closed a supply valve associated with the second pumping chamber while holding open an injection valve associated with the second pumping chamber.

The method defined above is suitably followed by: drawing molten polymer into the second pumping chamber from the melt supply; and simultaneously expelling molten polymer from the first pumping chamber into the mould cavity. Meanwhile, a supply valve associated with the first pumping chamber may be held closed while an injection valve associated with the first pumping chamber is held open; and simultaneously a supply valve associated with the second pumping chamber may be held open while an injection valve associated with the second pumping chamber is held closed.

The injection valve or the supply valve associated with a pumping chamber may be opened and closed in response to closing and opening of the other of those valves associated with that pumping chamber.

The method steps of the invention defined above may be repeated cyclically in alternation until the mould cavity is filled with molten polymer. For example, molten polymer may be expelled from the first and second pumping chambers into the mould cavity at respective injection locations spaced within the mould cavity. In that case, respective melt fronts may be advanced within the mould cavity in alternation from the respective injection locations, causing the respective melt fronts to converge and merge in the mould cavity.

Another approach is to expel molten polymer from the first and second pumping chambers into the mould cavity at a common injection location. In that case, shots of molten polymer may be injected sequentially into the mould cavity at the common injection location, those shots being expelled in alternation from the first and second pumping chambers.

Consequently, the invention also embraces injection moulding apparatus for coating a field joint, comprising: a mould tool positionable around the field joint to define a mould cavity; first and second pumping chambers communicating with the mould tool and preferably defined within a common pressurising cylinder, each chamber being reciprocally expansible in an induction stroke for drawing molten polymer into that chamber from a melt supply and reciprocally contractible in a compression stroke for driving molten polymer out of that chamber into the mould cavity in use; and first and second injection valves, each of those injection valves being associated with a respective one of the pumping chambers and being interposed in a flow path between that pumping chamber and an injection gate of the mould tool with which both of the pumping chambers communicate via the respective associated injection valves. Expansion of one of said chambers is synchronised with contraction of the other of said chambers such that the induction stroke of one of said chambers coincides with the compression stroke of the other of said chambers. The apparatus is arranged for sequential injection of shots of molten polymer into the mould cavity through the shared injection gate, those shots being output in alternation from the first and second pumping chambers.

Elegantly, the pumping chambers may be disposed end-to-end within the pressurising cylinder, where they may be separated by a piston that is movable within the pressurising cylinder. Movement of that piston within the pressurising cylinder determines and synchronises expansion and contraction of the pumping chambers.

The pressurising cylinder suitably has a central longitudinal axis that lies generally parallel to a central longitudinal axis of the mould tool. Advantageously, the pressurising cylinder is mounted to and supported by the mould tool.

The invention also extends to a method of coating a field joint of a pipeline, the method comprising: drawing molten polymer from a melt supply into a first pumping chamber and simultaneously expelling molten polymer from a second pumping chamber into a mould cavity around the field joint; followed by drawing molten polymer into the second pumping chamber from the melt supply and simultaneously expelling molten polymer from the first pumping chamber into the mould cavity; wherein shots of molten polymer expelled in alternation from the first and second pumping chambers are injected sequentially into the mould cavity at a common injection location.

The inventive concept also embraces a pipeline production facility comprising the apparatus of the invention or performing the method of the invention. The inventive concept extends to a pipeline or a field joint for a pipeline, produced by the apparatus of the invention, by performing the method of the invention or by the pipeline production facility of the invention.

In order that the invention may be more readily understood, reference will now be made, by way of example, to the accompanying drawings in which.

Figure 1:
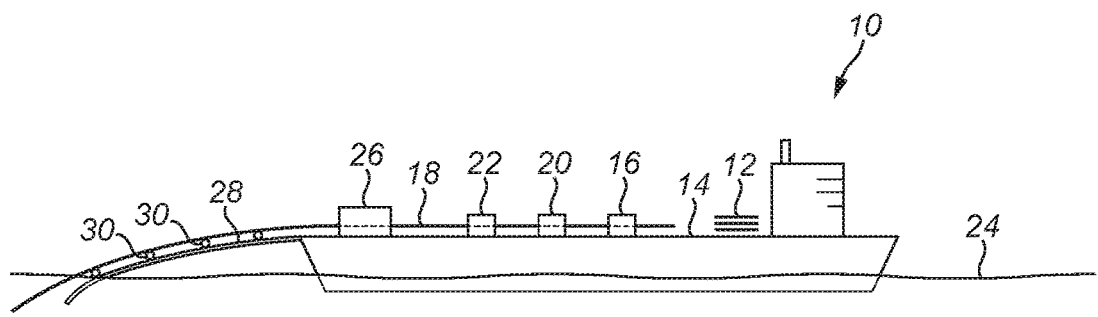
FIG. 1 is a schematic side view of a lay barge configured for S-lay operation, showing a typical context for the coating techniques of the present invention.

Referring firstly to the schematic view of FIG. 1 of the drawings, a pipelaying vessel 10 is configured for the S-lay installation method and moves from left to right as illustrated during a pipelaying operation. The vessel 10 carries a supply of pipe joints 12 on its deck 14 that are welded together at one or more welding stations 16 to form a pipe string 18 that moves aft with respect to the vessel 10 along a firing line. The welds are tested at one or more testing stations 20 located downstream (i.e. aft) of the welding stations 16 and are then coated at one or more coating stations 22 located downstream of the testing stations 20. The welding stations 16, testing stations 20 and coating stations 22 thus lie on the firing line along which the pipe string 18 moves as it is assembled, checked and coated before being launched from the vessel 10 into the sea 24.

The pipe string 18 is supported by a tensioner system 26 located downstream of the coating stations 22. The tensioner system 26 typically comprises multiple tensioners but such details are not relevant to the invention and so have been omitted from the drawings.

The pipe string 18 is launched from the vessel 10 over a stinger 28 extending aft of the vessel 10, located downstream of the tensioner system 26. The stinger 28 comprises rollers 30 that support the overbend of the pipe string 18 as it enters the sea 24.

In this example, the pipe string 18 hangs from the stinger 28 in a shallow S-shape under tension acting between the tensioner system 26 and a touchdown point on the sea bed (not shown). It is possible for a pipe string to experience a much greater deflection through the overbend than is shown in FIG. 1, especially in so-called Steep S-lay operations in which the departure angle of the pipe string is close to vertical as it leaves the stinger.

The present invention is concerned with coating operations performed at the coating stations 22 on the firing line, which will now be described with reference to FIGS. 2 to 6 of the drawings. Again, it is emphasised that the invention is not limited to S-lay operations or to use on a pipelaying vessel.

Figure 2:
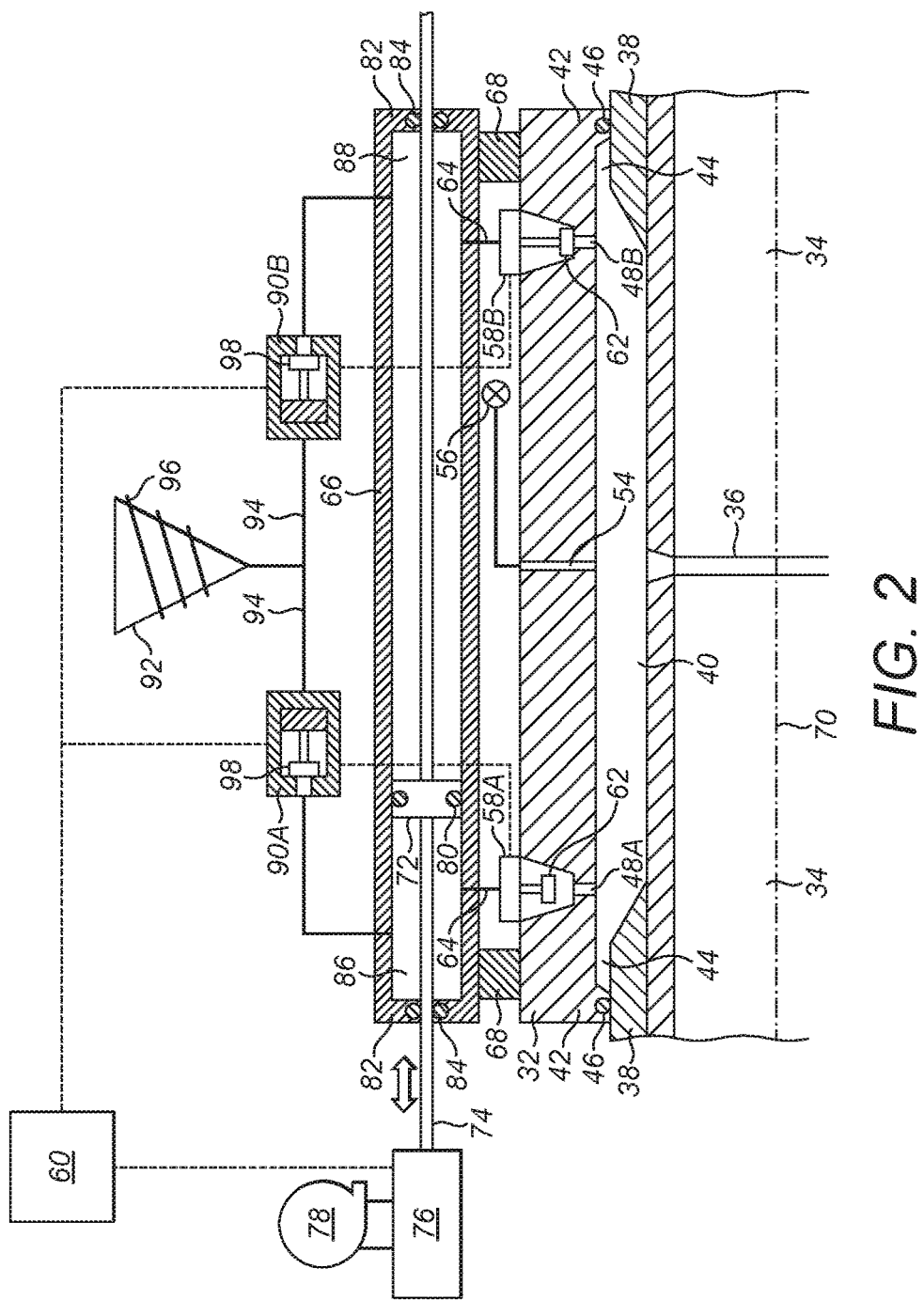
FIG. 2 is a schematic longitudinal sectional detail view of an injection moulding apparatus in accordance with the invention, including a mould tool positioned around a field joint.

FIG. 2 shows an injection moulding apparatus in accordance with the invention; FIGS. 3 to 6 show how molten polymer flows to fill a mould cavity within a mould tool of the apparatus.

In FIGS. 2 to 6, a mould tool 32 encircles a welded field joint of a pipeline at a coating station 22. The field joint is created between abutting pipe joints 34 where a circumferential butt weld 36 attaches the pipe joints 34 to each other.

Each pipe joint 34 is coated with a parent coating, for example a 5LPP coating 38, and that parent coating 38 terminates short of the end of each pipe joint 34 with a typically chamfered end shape. An annular gap lies between the opposed ends of the coating 38 around the weld 36, where the exposed external surfaces of the pipe joints 34 need to be coated. For this purpose, the mould tool 32 is fixed around the field joint, extending from one coating 38 to the other and overlapping those coatings 38 to define a mould cavity 40. The mould cavity 40 includes the annular gap between the coatings 38, into which molten thermoplastics material is injected as a field joint coating.

References in this description to the exposed external surfaces of the pipe joints 34 do not imply that those surfaces are of bare metal and so necessarily lack any coating at all. Instead, at these locations, the external surfaces of the pipe joints 34 lack a full-thickness parent coating: they could have a thin coating or layer, for example an anti-corrosion layer of FBE or a layer of polymer or adhesive to promote adhesion of a field joint coating. Thus, there may be at least one layer of plastics or composite material on the steel of the pipe joints 34 before a moulding operation. The role of such layers can be anti-corrosion, to treat the steel surface of the pipe joints 34 and/or to improve bonding of the field joint coating material.

The mould tool 32 comprises a tube of generally circular cross-section, typically divided longitudinally on a diameter of the cross-section into two half-shells. Opposed end portions 42 of the tube seat against the coatings 38 of the respective pipe joints 34 and so have an internal diameter corresponding to the external diameter of the coated pipe joints 34.

A central portion of the mould tool 32 that is disposed between the end portions 42 and that encompasses the gap between the coatings 38 has an increased internal diameter that exceeds the external diameter of the coated pipe joints 34. This increases the depth of the mould cavity 40 to allow for shrinkage of the injected thermoplastics material as it cools. The enlarged central portion extends beyond the chamfered ends of the coatings 38 to define extensions 44 of the mould cavity 40.

The two half-shells of the mould tool 32 are assembled together to encircle the field joint. The two half-shells are clamped together to hold them together against internal pressure in the mould cavity 40 in use. The clamping force also holds the end portions 42 of the mould tool 32 in sealing engagement with the coatings 38 of the pipe joints 34. Inwardly-facing seals 46 are provided in the end portions 42 for that purpose.

The tubular wall of the mould tool 32 is penetrated by an array of injection nozzles or gates 48 for injection into the mould cavity 40 of molten thermoplastics material, in this case PP 50.

The detail views of FIGS. 2 to 6 focus upon two gates 48A, 48B, spaced longitudinally along the mould tool 32. Those gates 48A, 48B are located inboard from the ends of the mould tool 32, in this example slightly inboard of the chamfered ends of the coatings 38 of the pipe joints 34.

It will be apparent from FIGS. 3 to 6 that molten PP 50 injected through the gates 48A, 48B creates two melt fronts 52 that converge between the gates 48A, 48B toward the centre of the mould cavity 40 and eventually merge with each other there. In doing so, the melt fronts 52 expel air from the mould cavity 40 through a vent 54 that penetrates the tubular wall of the mould tool 32 and is disposed centrally between the gates 48A, 48B. Optionally, as shown, the vent 54 communicates with a vacuum pump 56 that draws air from the mould cavity 40 through the vent 54, which aids filling of the mould cavity with molten PP 50.

Each gate 48A, 48B has a respective injector valve 58A, 58B that controls the injection of molten PP 50 through that gate 48A, 48B. The injector valves 58A, 58B are controlled directly or indirectly by a central control unit 60 and may be operated together or independently of each other. The injector valves 58A, 58B toggle such that when one injector valve 58A is closed, the other injector valve 58B is open and vice versa. To simplify illustration of their open and closed states, poppet valve elements 62 are shown schematically in the injector valves 58A, 58B; other valve types are of course possible.

The gates 48A, 48B with their associated injector valves 58A, 58B are supplied under pressure with molten PP 50 through respective outlet lines 64 from a pressurising cylinder 66. The pressurising cylinder 66 is mounted closely to the outside of the mould tool 32 by mounts 68 and is elongate, extending generally parallel to a central longitudinal axis 70 shared by the mould tool 32 and the pipe joints 34. This compact arrangement mitigates the bulk of previously-known apparatus used for IMPP operations. The short flow paths through the outlet lines 64 from the pressurising cylinder 66 to the mould tool 32 also optimise management of temperature.

The pressurising cylinder 66 is tubular and contains a piston 72 that slides reciprocally within the cylinder 66, driven by longitudinal movement of a drive rod 74 extending centrally along the bore of the cylinder 66. The drive rod 74 is driven reciprocally by a hydraulic actuator 76 outside one end of the pressurising cylinder 66; that hydraulic actuator 76 is powered, in turn, by a hydraulic power source such as a hydraulic pump 78.

The piston 72 is sealed to an inner bore surface of the pressurising cylinder 66 by one or more piston ring seals 80 that extend circumferentially around the piston 72. The pressurising cylinder has closed ends 82 with openings that are sealed to the drive rod 74 by respective circumferential end seals 84, through which the drive rod 74 slides during its reciprocal movement. The seals 80 and 84 may be implemented by O-rings or other sealing rings.

It will be apparent that the pressurising cylinder 66 and the piston 72 cooperate to define two chambers 86, 88 in longitudinal alignment, one each side of the piston 72 within the cylinder 66. Each chamber 86, 88 communicates with a respective outlet line 64 leading to a respective gate 48A, 48B.

The chambers 86, 88 vary in volume with push-pull movement of the piston 72 along the bore of the cylinder 66. Specifically, there is an inverse relationship between the volumes of the chambers 86, 88, such that a decrease in the volume of one chamber 86 is matched by an increase in the volume of the other chamber 88 and vice versa. Elegantly, in this preferred embodiment, that inverse relationship is determined simply by movement of a single piston 72, as the chambers 86, 88 are longitudinally-spaced portions of the same bore of the pressurising cylinder 66, divided from each other by the piston 72.

It follows from the inverse relationship between their volumes that one chamber 86, 88 expands as the other chamber 86, 88 contracts with longitudinal reciprocal movement of the piston 72. The chamber 86, 88 that is expanding in an induction stroke generates low pressure within that chamber 86, 88, which draws molten PP 50 into it. Conversely, the chamber 86, 88 that is contracting in a compression stroke generates high pressure within that chamber 86, 88, which expels molten PP 50 from it.

During an induction stroke, molten PP 50 is drawn into an expanding chamber 86, 88 through a respective supply valve 90A, 90B that controls the supply of molten PP 50 to that chamber 86, 88. The supply valves 90A, 90B receive molten PP 50 from a heated hopper 92 via respective feed lines 94. The hopper 92 is heated by an electric coil 96 or by electric pads or other heating means powerful enough to provide sufficient flow of PP 50 at a high enough molten temperature for the rate of production. The vertical position of the hopper 92 above the mould tool 32 aids compactness.

The pressurising cylinder 66 is also heated by an electric coil, by electric pads or by other heating means to keep the PP 50 molten. Such heating means are known from injection-moulding equipment generally and have been omitted from the pressurising cylinder 66 in the drawings for ease of illustration.

The supply valves 90A, 90B are controlled directly by the central control unit 60 and may be operated together or independently of each other. Like the injection valves 58, the supply valves 90 toggle such that when one supply valve 90A is closed, the other supply valve 90B is open and vice versa. Again, to simplify illustration of their open and closed states, poppet valve elements 98 are shown schematically in the supply valves 90A, 90B; again, other valve types are possible.

There is also an inverse, toggled relationship between the opening and closing of each supply valve 90A, 90B and an associated one of the injector valves 58A, 58B. Thus, when a supply valve 90A, 90B is closed, the associated injector valve 58A, 58B is open and vice versa.

Thus, opening and closing of the injector valves 58A, 58B and the supply valves 90A, 90B is synchronised with each other and with reciprocal movement of the piston 72. For the purpose of synchronisation with movement of the piston 72, the control unit 60 suitably takes positional input from a displacement sensor (not shown) on the drive rod 74. In this way, the operation of the injector valves 58A, 58B and the supply valves 90A, 90B is slaved to the movement and position of the drive rod 74.

In the preferred embodiment shown, the injector valves 58A, 58B are slaved to respective supply valves 90A, 90B, such then when the supply valves 90A, 90B are opened or closed by the control unit 60, the associated injector valves 58A, 58B automatically adopt the opposite state without necessarily receiving control signals directly from the control unit 60.

The molten PP 50 expelled from a contracting chamber 86, 88 during a compression stroke enters the mould cavity 40 through the outlet line 64 and the gate 48A, 48B associated with that chamber 86, 88, when the injector valve 58A, 58B of that gate 48A, 48B is open. By virtue of the toggled relationship between the supply valves 90A, 90B and the associated injector valves 58A, 58B, the supply valve 90A, 90B associated with a contracting chamber 86, 88 must then be closed to ensure that molten PP 50 cannot be forced back along the feed lines 94 to the hopper 92.

An injection moulding operation of the invention will now be described with specific reference to FIGS. 3 to 6.

Before the injection moulding operation begins, the bare uncoated external surfaces of the pipe joints 34 around the welded field joint are cleaned, primed and heated, as are the chamfered end surfaces of the parent coatings 38. The half-shells of the mould tool 32 are then assembled and clamped around the field joint.

Figure 3:
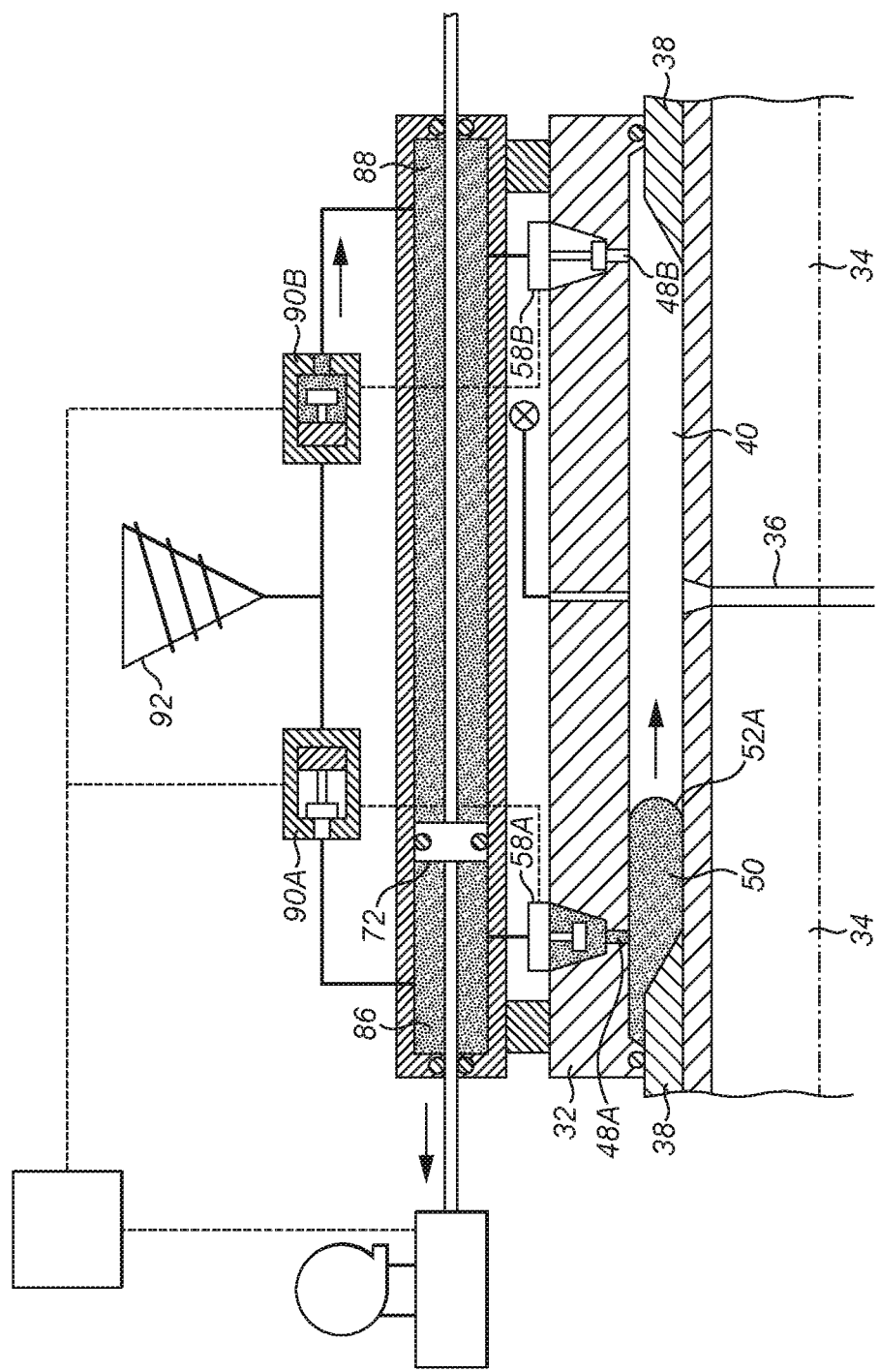
FIGS. 3 to 6 are a sequence of longitudinal sectional detail views corresponding to FIG. 2 and showing the progression over time of an injection moulding operation in accordance with the invention.

In FIG. 3, the injection moulding operation has begun and the piston 72 is moving from right to left as illustrated. A first shot of molten PP 50 previously drawn into the chamber 86 from the hopper 92 through the supply valve 90A is now being expelled from the chamber 86 through the open injector valve 58A and its associated gate 48A into the mould cavity 40. The supply valve 90A is now closed. Molten PP 50 has filled the end of the mould cavity 40 adjacent the gate 48A and a first melt front 52A is advancing from the gate 48A toward the other end of the mould cavity 40.

As the chamber 86 contracts in its compression stroke, the chamber 88 expands in its induction stroke. Molten PP 50 is being drawn into the chamber 88 from the hopper 92 through the supply valve 90B, which is now open. The injector valve 58B is closed at this stage.

Figure 4:
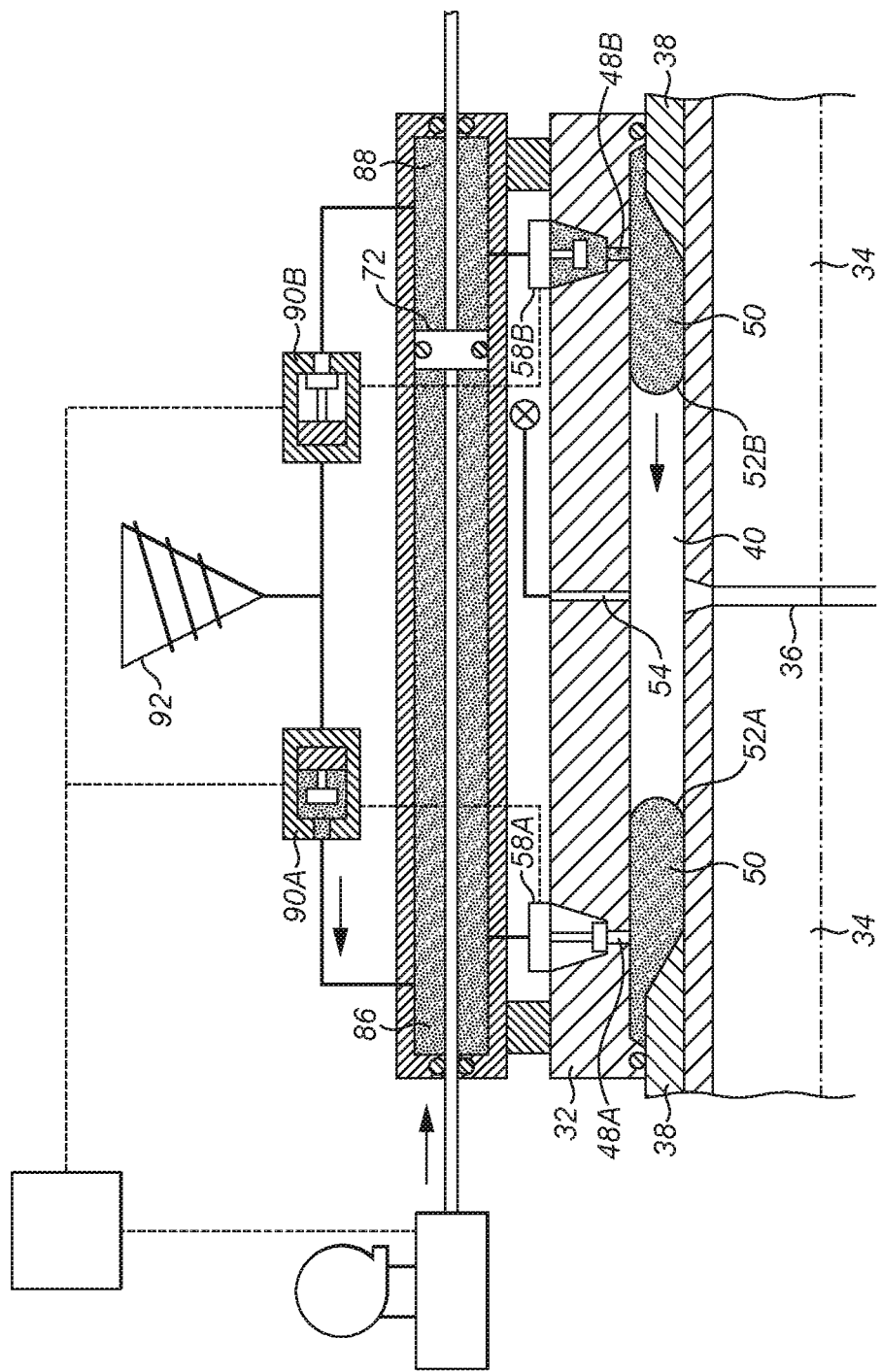

FIG. 4 shows the piston 72 now moving from left to right as illustrated. The chamber 88 is now contracting in its compression stroke, with supply valve 90B closed and injector valve 58B open. Consequently, a second shot of molten PP 50 previously drawn into the chamber 88 from the hopper 92 through the supply valve 90B is now being expelled from the chamber 88 through the open injector valve 58B and its associated gate 48B into the mould cavity 40. The result is that molten PP 50 has filled the end of the mould cavity 40 adjacent the gate 48B and a second melt front 52B is advancing from the gate 48B toward the other end of the mould cavity 40.

Meanwhile, as the chamber 88 contracts in its compression stroke, the chamber 86 expands in its induction stroke. A third shot of molten PP 50 is being drawn into the chamber 86 from the hopper 92 through the supply valve 90A, which is now open. As the injector valve 58A is now closed, the first melt front 52A is stationary at a position part-way along the length of the mould cavity 40 between the gate 48A and the central vent 54. No heat is being introduced at this point through the gate 48A to the first shot of molten PP 50, which therefore can start to cool although it will still remain molten at this stage.

Figure 5:
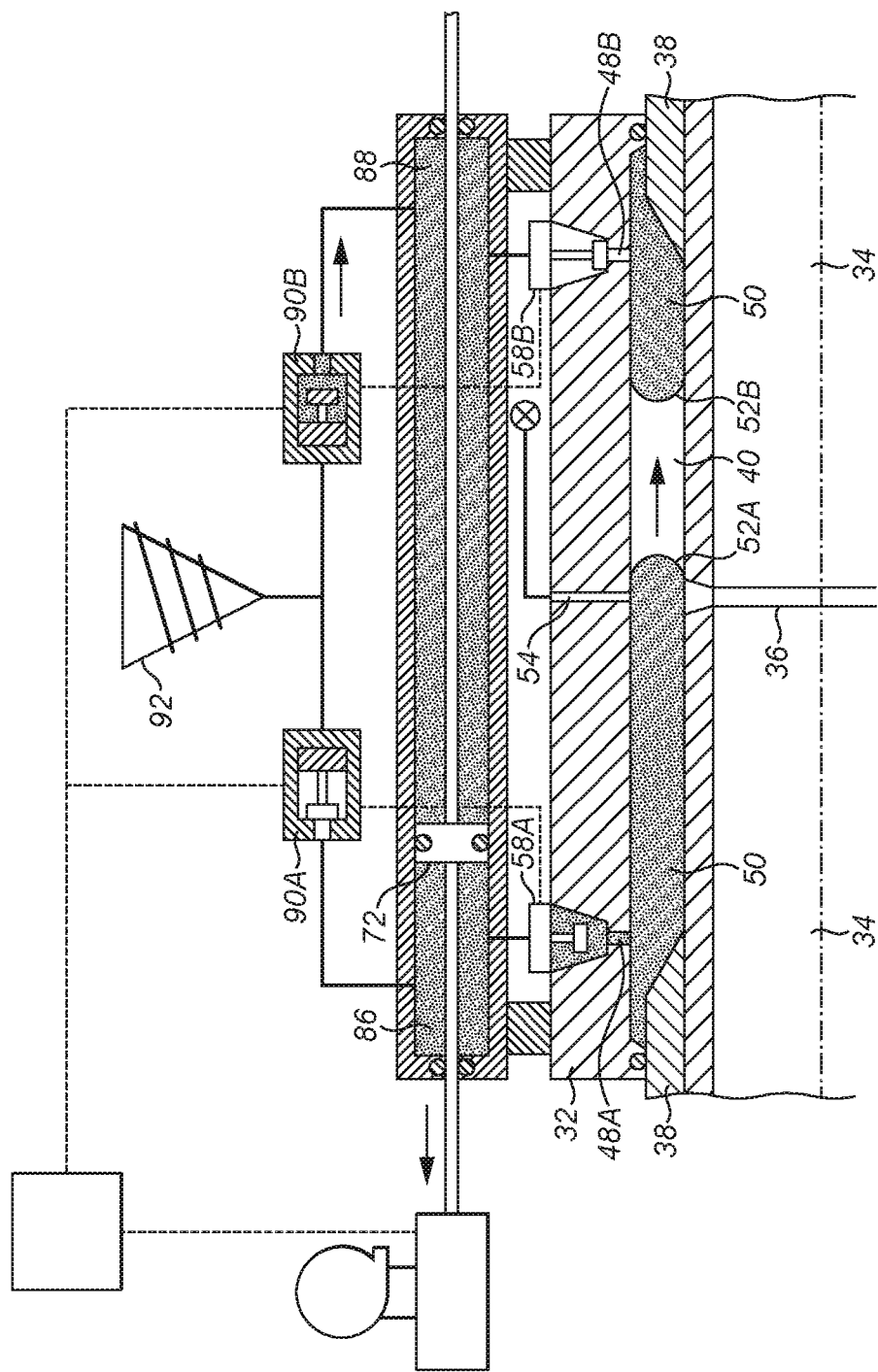

FIG. 5 shows the piston 72 having changed direction again to move from right to left once more. The state of the injector valves 58A, 58B and the supply valves 90A, 90B is the same as shown in FIG. 3. The effect is that the third shot of molten PP 50 is now being expelled from the chamber 86 into the mould cavity 40 through the gate 48A, where it propels the first melt front 52A further along the mould cavity 40, just past the vent 54.

Meanwhile, a fourth shot of molten PP 50 is being drawn into the chamber 88 from the hopper 92 through the supply valve 90B, which is now open. At this stage, as the injector valve 58B is now closed, no heat is being introduced through the gate 48B to the second shot of molten PP 50. The second shot of molten PP 50 can therefore start to cool although it will also still remain molten at this stage.

Figure 6:
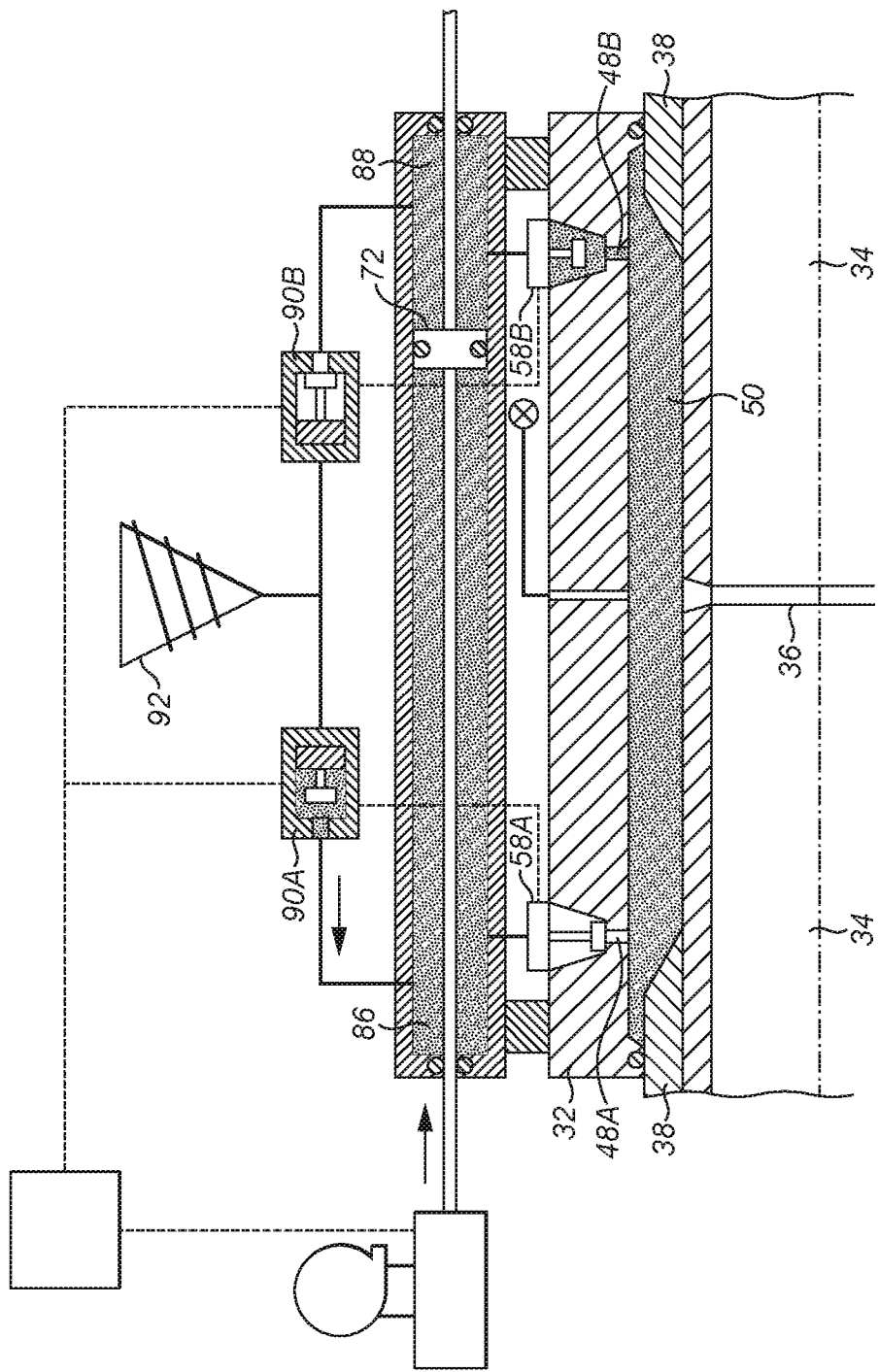

Finally, FIG. 6 shows the piston 72 having changed direction once again to move again from left to right. The state of the injector valves 58A, 58B and the supply valves 90A, 90B is the same as shown in FIG. 4. The effect is that the fourth shot of molten PP 50 is now being expelled from the chamber 88 into the mould cavity 40 through the gate 48B, where it propels the second melt front 52B further along the mould cavity 40 to merge with the first melt front 52A and hence to fill the mould cavity 40.

As no further molten PP 50 need enter the mould cavity 40, no heat is being introduced at this point through the gates 48A or 48B to the molten PP 50 already in the mould cavity 40, which therefore can continue cooling to eventual solidity. Movement of the piston 72 can then cease and the injector valve 58B can be closed.

Further to accelerate cooling of molten PP injected into the mould cavity 40, the mould tool 32 may have a cooling system comprising a water jacket created by an array of pipes embedded in or disposed on the tubular wall of the mould tool 32. Such pipes are a well-known measure and have been omitted from the mould tool 32 in the drawings for ease of illustration. Other cooling fluids such as oil or a gas could be pumped through such pipes instead of water. It is also possible for a warm fluid to be pumped through such pipes so as to warm up the mould tool 32 before use.

If desired, packing pressure may be exerted briefly through an open injector valve 58B to compensate somewhat for shrinkage of the cooling PP 50 in the mould cavity 40. In that case, continued movement of the piston 72 may contract the chamber 88 further to inject a little more molten PP 50 through the gate 48B to keep the mould cavity 40 full before the PP 50 in the gate 48B starts to freeze and the injector valve 58B is shut.

In this simplified example, the mould cavity 40 is filled by four shots of molten PP 50. In practice, more or fewer shots of PP 50 driven by more or fewer reciprocal cycles of the piston 72 may be necessary to fill the mould cavity 40.

When the operation parameters have been checked and the PP 50 in the mould cavity 40 has cooled and solidified to an appropriately self-supporting extent, the two half-shells of the mould tool 32 are unclamped and separated from the field joint in a demoulding operation. The PP 50 is then air-cooled to ambient temperature by exposure to ambient air.

If faster cooling is required, air or other cooling gases may be blown over the exposed PP 50 to cool the PP 50 by conduction and convection. Alternatively, or additionally, a cooling liquid such as water may be sprayed or poured over the exposed PP 50, to cool the PP 50 by conduction and evaporation. The temperature and/or the flow rate of cooling liquids or gases may be modified to control the rate of cooling; for example, such liquids or gases may be refrigerated to below ambient temperature.

By virtue of the oversized central portion of the mould tool 32 allowing for shrinkage of the PP 50 as it cools, the external diameter of the finished field joint coating will broadly correspond to the external diameter of the coated pipe joints 34 to either side of the field joint. By virtue of the extensions 44 at the ends of the mould cavity 40, the ends of the field joint coating overlap the parent coatings 38 slightly. Those overlaps beneficially lengthen and hence increase the area of the interfaces between the parent coatings 38 and the field joint coating.

Figure 7:
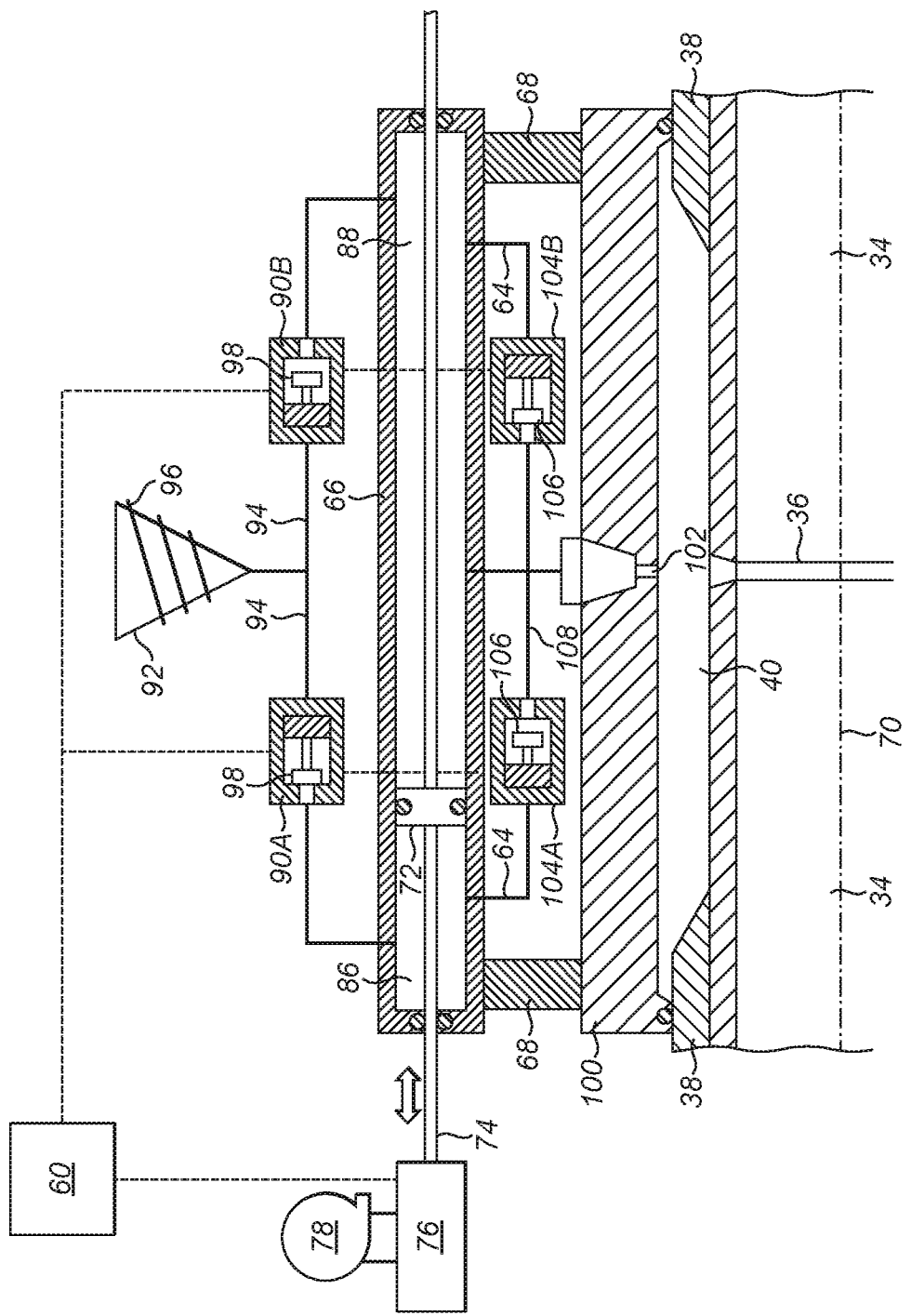
FIG. 7 is a schematic longitudinal sectional detail view of an injection moulding apparatus in a second embodiment of the invention.

FIG. 7 of the drawings shows a second embodiment of the invention. Many of the features of the second embodiment are shared with the first embodiment shown in FIGS. 2 to 6: consequently, like numerals are used for like features.

For clarity, the drawing in FIG. 7 is simplified by omitting the air vent 54 and vacuum pump 56 of the first embodiment. An arrangement of one or more air vents and vacuum pumps can of course be used in the second embodiment, as will be clear to the skilled reader.

In the mould tool 100 of FIG. 7, the gates 48A and 48B of the first embodiment are replaced by a single gate 102 in a longitudinally central position with respect to the mould cavity 40. This is to illustrate the concept that multiple chambers 86, 88 may feed one gate 102, although the mould tool 100 could have more than one of such shared gates.

Injector valves 104A, 104B control the injection of molten PP through the gate 102. The injector valves 104A, 104B are controlled directly or indirectly by the central control unit 60 in toggled relation such that when one injector valve 104A is closed, the other injector valve 104B is open and vice versa. Again, to simplify illustration of their open and closed states, poppet valve elements 106 are shown schematically in the injector valves 104A, 104B.

During an induction stroke, molten PP is drawn into an expanding chamber 86, 88 of the pressurising cylinder 66 through the respective supply valve 90A, 90B, which controls the supply of molten PP to that chamber 86, 88 from the heated hopper 92.

Opening and closing of the injector valves 104A, 104B and the supply valves 90A, 90B is synchronised with each other and with reciprocal movement of the piston 72. There is an inverse, toggled relationship between the opening and closing of each supply valve 90A, 90B and the associated one of the injector valves 104A, 104B. Thus, when a supply valve 90A, 90B is closed, the associated injector valve 58A, 58B is open and vice versa.

Like the first embodiment, the injector valves 104A, 104B are slaved to respective supply valves 90A, 90B, such then when the supply valves 90A, 90B are opened or closed by the control unit 60, the associated injector valves 104A, 104B automatically adopt the opposite state.

Molten PP expelled from a contracting chamber 86, 88 of the pressurising cylinder 66 during a compression stroke is supplied under pressure to a respective one of the injector valves 104A, 104B through respective outlet lines 64. The injector valve 104A, 104B associated with a contracting chamber 86, 88 is open. By virtue of the toggled relationship between the supply valves 90A, 90B and the associated injector valves 104A, 104B, the supply valve 90A, 90B associated with that contracting chamber 86, 88 must then be closed to ensure that molten PP cannot be forced back along the feed lines 94 to the hopper 92.

Downstream of the injector valves 104A, 104B. a two-into-one manifold 108 connects both injector valves 104A, 104B to the gate 102. Thus, when an injector valve 104A, 104B is open, molten PP flows through the manifold 108 from that open injector valve 104A, 104B to enter the mould cavity 40 via the gate 102.

The flow of molten PP through the gate 102 is interrupted only as the piston 72 changes direction within the pressurising cylinder 66. Thus, the flow of molten PP into the mould cavity 40 can be nearly continuous if the piston 72 changes direction quickly.

A result of the alternating outputs of molten PP from the chambers 86, 88 and the synchronised toggling of the injector valves 104A, 104B is that shots of molten PP injected through the gate 102 emanating from one chamber 86, 88 alternate with shots of molten PP emanating from the other chamber 86, 88. As those shots pass sequentially through the manifold 108 and the gate 102 and only one of the injector valves 104A, 104B is open at any one time, there is no problem of back-pressure. Also, reducing the number of gates by sharing them between two or more pumping chambers may help to improve the continuity of injection and the consistency and quality of the resulting field joint coating.

In general, each chamber 86, 88 may have one or multiple outlets, each outlet communicating with an individual respective gate. Alternatively, each chamber 86, 88 may have one or multiple outlets, the or each outlet of one chamber communicating with a gate that is shared with an outlet of the other chamber.

Many other variations are possible within the inventive concept. For instance, there may be other gates or they may be positioned differently: in one example, a circumferential array of gates may be spaced around the circumference of the mould tool.

As is well known in the art of moulding thermoplastics, inner surfaces of the mould tool facing the mould cavity may be treated with a non-stick treatment such as a PTFE coating or may have release agents applied to them to discourage adhesion between the mould tool and the field joint coating.

Optionally, a mould tool cooling system may be supplemented by a pipe cooling device positioned inside the abutting pipe joints to cool the molten PP by accelerating conduction of heat through the pipe wall. Such a pipe cooling device may, for example, be a refrigerated pig or a spray head that is movable longitudinally along the pipe to apply cooling where it is needed. An example of such a spray head is disclosed in WO 2012/004665.

The thermoplastics material used for injection moulding may be PP, polystyrene or other suitable thermoplastics material that is compatible with the coating applied to the pipe joints. Additives or modifiers may be employed, such as an elastomeric modifier like EDPM (ethylene propylene diene monomer rubber) to provide appropriate flexibility and impact resistance, or fibres of glass, aramid or carbon to increase strength and elastic modulus. Additives such as fibres may also reduce shrinkage and speed cooling.

The invention claimed is:

1. An injection moulding apparatus for coating a field joint of a pipeline, the apparatus comprising:
   a mould tool positionable around the field joint to define a mould cavity; and
   first and second pumping chambers defined within a common pressurising cylinder and communicating with the mould tool, each chamber being reciprocally expansible in an induction stroke for drawing molten polymer into that chamber from a melt supply and reciprocally contractible in a compression stroke for driving molten polymer out of that chamber into the mould cavity in use;

wherein expansion of one of said chambers is synchronised with contraction of the other of said chambers such that the induction stroke of one of said chambers coincides with the compression stroke of the other of said chambers;

and wherein the pumping chambers are disposed end-to-end within the pressurising cylinder and are separated by a piston that is movable within the pressurising cylinder, movement of that piston within the pressurising cylinder determining and synchronising expansion and contraction of the pumping chambers.

2. The apparatus of claim 1, wherein the pressurising cylinder has a central longitudinal axis that lies generally parallel to a central longitudinal axis of the mould tool.

3. The apparatus of claim 1, wherein the pressurising cylinder is mounted to and supported by the mould tool.

4. The apparatus of claim 1 and further comprising first and second injection valves, each of those injection valves being associated with a respective one of the pumping chambers and being interposed in a flow path between that pumping chamber and an injection gate of the mould tool.

5. The apparatus of claim 4, wherein first and second injection gates communicate with the mould tool, each of those injection gates communicating with a respective one of the pumping chambers.

6. The apparatus of claim 5 and being arranged for injection of molten polymer into the mould cavity through the first and second injection gates from the respective associated pumping chambers in alternation.

7. The apparatus of claim 4, wherein the first and second pumping chambers both communicate with a shared injection gate via the respective associated injection valves.

8. The apparatus of claim 7 and being arranged for sequential injection of shots of molten polymer into the mould cavity through the shared injection gate, those shots being output in alternation from the first and second pumping chambers.

9. The apparatus of claim 4 and further comprising a controller acting directly or indirectly on the first and second injection valves in coordination with expansion and contraction of the associated pumping chambers, which controller is programmed to maintain the first and second injection valves in mutually opposite open and closed states while the mould cavity is being filled with molten polymer.

10. The apparatus of claim 9, wherein the controller is programmed to hold open at least one of the first and second injection valves to pack the mould cavity during initial cooling of the molten polymer in the mould cavity.

11. The apparatus of claim 9, wherein the controller is programmed to close the first and second injection valves during solidification of the molten polymer in the mould cavity.

12. The apparatus of claim 4 and further comprising first and second supply valves, each of those supply valves being associated with a respective one of the pumping chambers and being interposed in a flow path between the melt supply and the associated pumping chamber.

13. The apparatus of claim 12, wherein the controller is programmed to maintain the first and second supply valves in mutually opposite open and closed states while the mould cavity is being filled with molten polymer.

14. The apparatus of claim 13 and being arranged to maintain the injection valve and the supply valve associated with a respective one of the first and second pumping chambers in mutually opposite open and closed states while the mould cavity is being filled with molten polymer.

15. The apparatus of claim 14, wherein opening and closing of the injection valve or the supply valve associated with a pumping chamber is slaved to closing and opening of the other of those valves associated with that pumping chamber.

16. A pipeline production facility comprising the apparatus of claim 1.

17. A method of coating a field joint of a pipeline, the method comprising:
drawing molten polymer from a melt supply into a first pumping chamber of a pressurising cylinder; and simultaneously
expelling molten polymer from a second pumping chamber of that pressurising cylinder into a mould cavity around the field joint.

18. The method of claim 17, followed by:
drawing molten polymer into the second pumping chamber from the melt supply; and simultaneously
expelling molten polymer from the first pumping chamber into the mould cavity.

19. The method claim 17, repeated cyclically in alternation until the mould cavity is filled with molten polymer.

20. The method of claim 17, comprising:
holding open a supply valve associated with the first pumping chamber while holding closed an injection valve associated with the first pumping chamber; and simultaneously
holding closed a supply valve associated with the second pumping chamber while holding open an injection valve associated with the second pumping chamber.

21. The method of claim 18, comprising:
holding closed a supply valve associated with the first pumping chamber while holding open an injection valve associated with the first pumping chamber; and simultaneously
holding open a supply valve associated with the second pumping chamber while holding closed an injection valve associated with the second pumping chamber.

22. The method of claim 20, comprising opening and closing the injection valve or the supply valve associated with a pumping chamber in response to closing and opening of the other of those valves associated with that pumping chamber.

23. The method of claim 18, comprising expelling molten polymer from the first and second pumping chambers into the mould cavity at respective injection locations spaced within the mould cavity.

24. The method of claim 23, comprising advancing respective melt fronts within the mould cavity in alternation from the respective injection locations.

25. The method of claim 24, comprising converging and merging the respective melt fronts in the mould cavity.

26. The method of claim 18, comprising expelling molten polymer from the first and second pumping chambers into the mould cavity at a common injection location.

27. The method of claim 26, comprising sequentially injecting shots of molten polymer into the mould cavity at the common injection location, those shots being expelled in alternation from the first and second pumping chambers.

28. An injection moulding apparatus for coating a field joint of a pipeline, the apparatus comprising:
a mould tool positionable around the field joint to define a mould cavity;
first and second pumping chambers communicating with the mould tool, each chamber being reciprocally expansible in an induction stroke for drawing molten polymer into that chamber from a melt supply and reciprocally contractible in a compression stroke for driving molten polymer out of that chamber into the mould cavity in use; and first and second injection valves, each of those injection valves being associated with a respective one of the pumping chambers and being interposed in a flow path between that pumping chamber and an injection gate of the mould tool with which both of the pumping chambers communicate via the respective associated injection valves;

wherein expansion of one of said chambers is synchronised with contraction of the other of said chambers such that the induction stroke of one of said chambers coincides with the compression stroke of the other of said chambers; and the apparatus is arranged for sequential injection of shots of molten polymer into the mould cavity through the shared injection gate, those shots being output in alternation from the first and second pumping chambers.

29. The apparatus of claim 28, wherein the pumping chambers are defined within a common pressurising cylinder.

30. The apparatus of claim 29, wherein the pumping chambers are disposed end-to-end within the pressurising cylinder.

31. The apparatus of claim 30, wherein the pumping chambers are separated by a piston that is movable within the pressurising cylinder, movement of that piston within the pressurising cylinder determining and synchronising expansion and contraction of the pumping chambers.

32. A method of coating a field joint of a pipeline, the method comprising:

drawing molten polymer from a melt supply into a first pumping chamber and simultaneously expelling molten polymer from a second pumping chamber into a mould cavity around the field joint;

followed by drawing molten polymer into the second pumping chamber from the melt supply and simultaneously expelling molten polymer from the first pumping chamber into the mould cavity;

wherein shots of molten polymer expelled in alternation from the first and second pumping chambers are injected sequentially into the mould cavity at a common injection location.

33. The method of claim 32, comprising:

holding open a supply valve associated with the first pumping chamber while holding closed an injection valve associated with the first pumping chamber; and simultaneously holding closed a supply valve associated with the second pumping chamber while holding open an injection valve associated with the second pumping chamber.

34. The method of claim 33, followed by:

holding closed a supply valve associated with the first pumping chamber while holding open an injection valve associated with the first pumping chamber; and simultaneously holding open a supply valve associated with the second pumping chamber while holding closed an injection valve associated with the second pumping chamber.

35. The method of claim 33, comprising opening and closing the injection valve or the supply valve associated with a pumping chamber in response to closing and opening of the other of those valves associated with that pumping chamber.

* * * * *